United States Patent [19]

Escareno et al.

[11] Patent Number: 5,742,227
[45] Date of Patent: Apr. 21, 1998

[54] SYSTEM AND METHOD FOR VEHICLE THEFT PREVENTION AND RECOVERY

[76] Inventors: Joe Escareno, #382, 17350 E. Temple Ave., LaPuente, Calif. 91744; Manny Argomaniz, 5383 Yale St., Montclair, Calif. 91763

[21] Appl. No.: 642,791

[22] Filed: May 3, 1996

[51] Int. Cl.$^6$ ............................................. B60R 25/10
[52] U.S. Cl. .................. 340/426; 340/430; 340/460; 340/539; 307/10.2
[58] Field of Search .................... 340/426, 460, 340/430, 825.44, 539; 307/10.2

[56] References Cited

U.S. PATENT DOCUMENTS

| | | | |
|---|---|---|---|
| 4,047,411 | 9/1977 | Conley | 340/426 |
| 4,962,522 | 10/1990 | Marian | 340/825.44 |
| 5,276,728 | 1/1994 | Pagliaroli | 340/426 |
| 5,315,285 | 5/1994 | Nykerk | 340/426 |
| 5,319,351 | 6/1994 | Beezley, Jr. | 340/426 |
| 5,349,329 | 9/1994 | Smith | 340/426 |
| 5,432,495 | 7/1995 | Tompkins | 340/426 |
| 5,448,218 | 9/1995 | Espinosa | 340/426 |

*Primary Examiner*—Thomas Mullen
*Assistant Examiner*—Daniel J. Wu
*Attorney, Agent, or Firm*—Boniard I. Brown

[57] ABSTRACT

A vehicle theft prevention and recovery system is activated by a pager upon receiving a telephonic signal from a pager service, in response to a call from a vehicle owner or operator, to activate anti-theft means including a warning to a thief in the vehicle, means for disabling the vehicle engine, and visual and audible alarm signal devices to identify the vehicle as stolen.

18 Claims, 2 Drawing Sheets

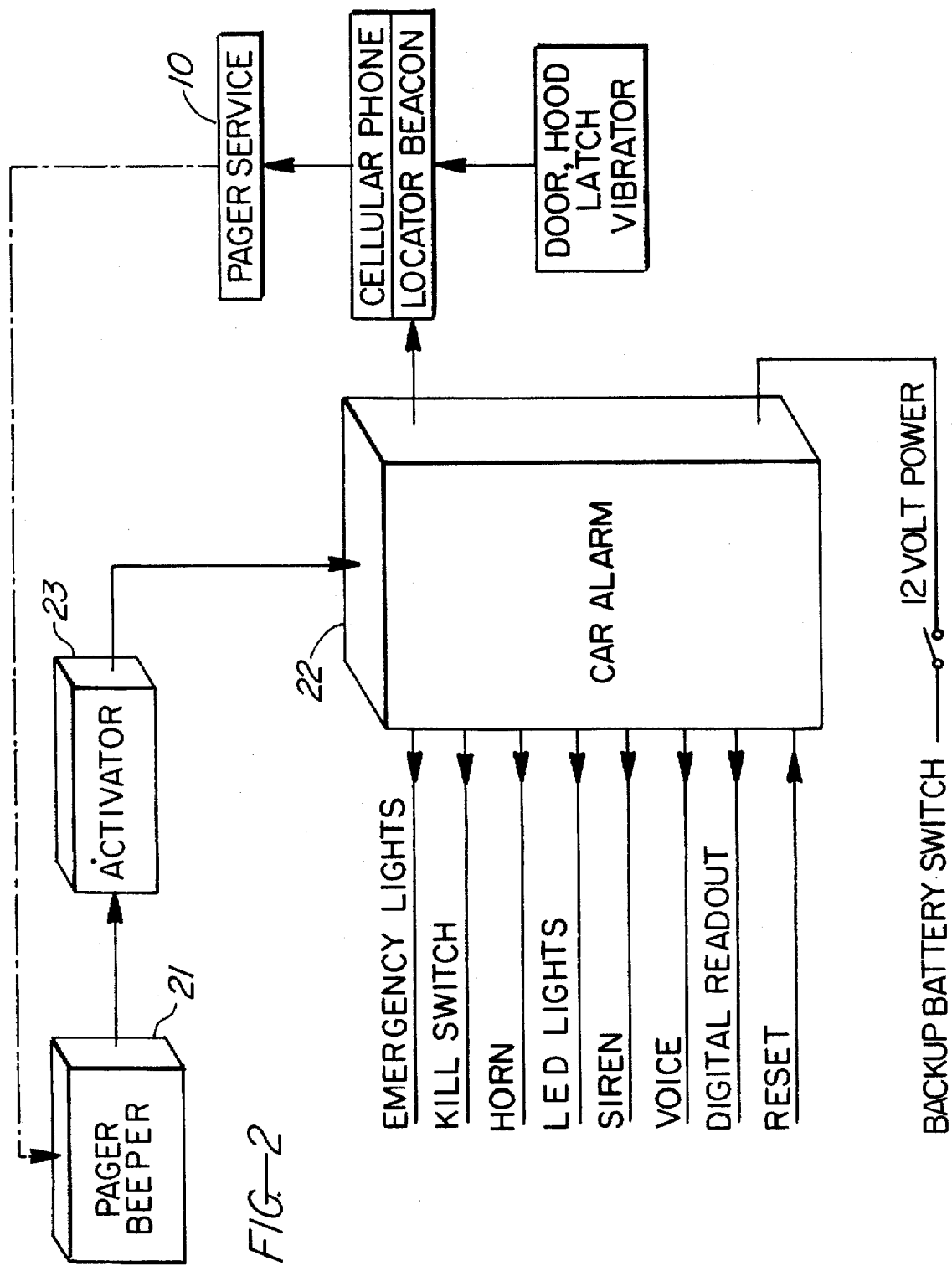

SYSTEM AND METHOD FOR VEHICLE THEFT PREVENTION AND RECOVERY

BACKGROUND OF THE INVENTION

1. Field of the Invention

The present invention relates generally to vehicle theft prevention and recovery systems, and more particularly to such a system wherein a pager at the vehicle activates functions including at least a warning to a thief in the vehicle and disabling the vehicle engine.

2. Prior Art

Vehicle theft has long been widespread, particularly with respect to automotive vehicles, with resultant high costs to society, including high insurance rates to cover losses and services of law enforcement organizations.

The present invention aids in prevention of vehicle theft and facilitates the location identification of stolen vehicles. The disabling system, according to the invention, is not activated until after the vehicle is stolen. The thief is not aware of the disabling device until the thief is automatically warned of impending vehicle disablement.

Remotely operable devices or systems for disabling vehicles are known in the prior art, although a variety of anti-theft devices and equipment have been developed, vehicle thieves have conceived various ways to disable or circumvent any systems and devices.

Relatively expensive and complex systems, such as LOJAC™ provide after-the-fact retrieval systems, which well-known systems do not actually prevent theft of vehicles, but may enable location of a vehicle after its theft. It is desirable that an anti-theft system operate to prevent vehicle theft or high-jacking in progress or interrupt the theft in the early stages before the vehicle and criminal evidence can move undesirably far away.

Certain prior systems, although activated by a call to a central service and operate to disable a vehicle, present legal liability problems related to disablement of a vehicle under hazardous circumstance, with no warning to the thief in the vehicle. Further, such systems tend to be relatively expensive and complex. Such arrangements include those of the U.S. Pat. No. 4,067,411 to Conley and U.S. Pat. No. 5,276,728 to Pagliaroli.

Certain prior art systems involve specialized components and Functions. Smith U.S. Pat. No. 5,349,329 involves a transmitter carried by a driver, and a receiver and disabling switch in the vehicle. When the receiver does not detect the signal from the transmitter, the disabling switch disables the vehicle. Such a system is of relatively limited use and is subject to problems, as upon any failure of the system. The system of Beezley, Jr. U.S. Pat. No. 5,319,351 is activated by the seating of a person in the vehicle driver's seat. If not disarmed by the driver-owner by operating a disarming switch, the system reacts to police radars and gives an alarm. Such a system is of rather limited use, and is subject to operator error.

U.S. Pat. No. 4,962,522 to Marian relates to an irrigation system activated by a paging station which is telephoned to send a signal to a pager at an irrigation site for remote activation of sprinklers.

The present invention addresses and relieves problems and shortcomings of prior devices and systems.

BRIEF SUMMARY OF THE INVENTION

The present invention provides a vehicle theft prevention and recovery system which includes a pager at a vehicle which is activated upon receiving a telephone call, as from a pager service which is called and alerted by the vehicle owner or operator upon becoming aware of theft or attempted theft of the vehicle. The pager thus activated initiates a radio signal having digital modulation for digital readout to provide respective formats to respective activators to cause actuators to actuate anti-theft functions, including the provision of a warning to an occupant or thief in the vehicle, and disabling of the vehicle engine. Other functions are preferably also activated, including the audible alarms and lights to enable police or other persons to identify the vehicle as stolen.

The activated devices or functions include means, audible and/or visible, to an operator or thief in the vehicle of impending vehicle disablement to occur within a stated time, such as three minutes or less. This enables the thief or occupant to leave the street or roadway and park the vehicle, thus relieving the vehicle owner or operator of liability of damages caused by the vehicle being disabled in a hazardous situation, such as the fast lane of a freeway or other relatively fast traffic. Such warning may employ a countdown display on the vehicle instrument panel.

The activated functions may include a device for activating the vehicle horn, a device for activating a siren, a device for energizing a radio beacon to enable police-tracking, a device for energizing the vehicle emergency flasher lights, a light emitting diode display as well as a killswitch device for disabling the vehicle engine.

The car alarm functions are re-set upon vehicle owner or operator re-gaining use of the vehicle.

The system according to the invention provides effective vehicle theft prevention and recovery arrangement, involving relatively low-cost equipment and reasonable charges of a paging service which, even including additional charges for a "voice panel" or a pager capable of alphanumeric messages, is relatively inexpensive and affordable.

BRIEF DESCRIPTION OF THE DRAWINGS

FIG. 2 is a block diagram illustration of interrelationships between a pager, pager service and vehicle anti-theft functions controlled in accordance with the present invention.

DESCRIPTION OF THE PREFERRED EMBODIMENTS

Figure 1:
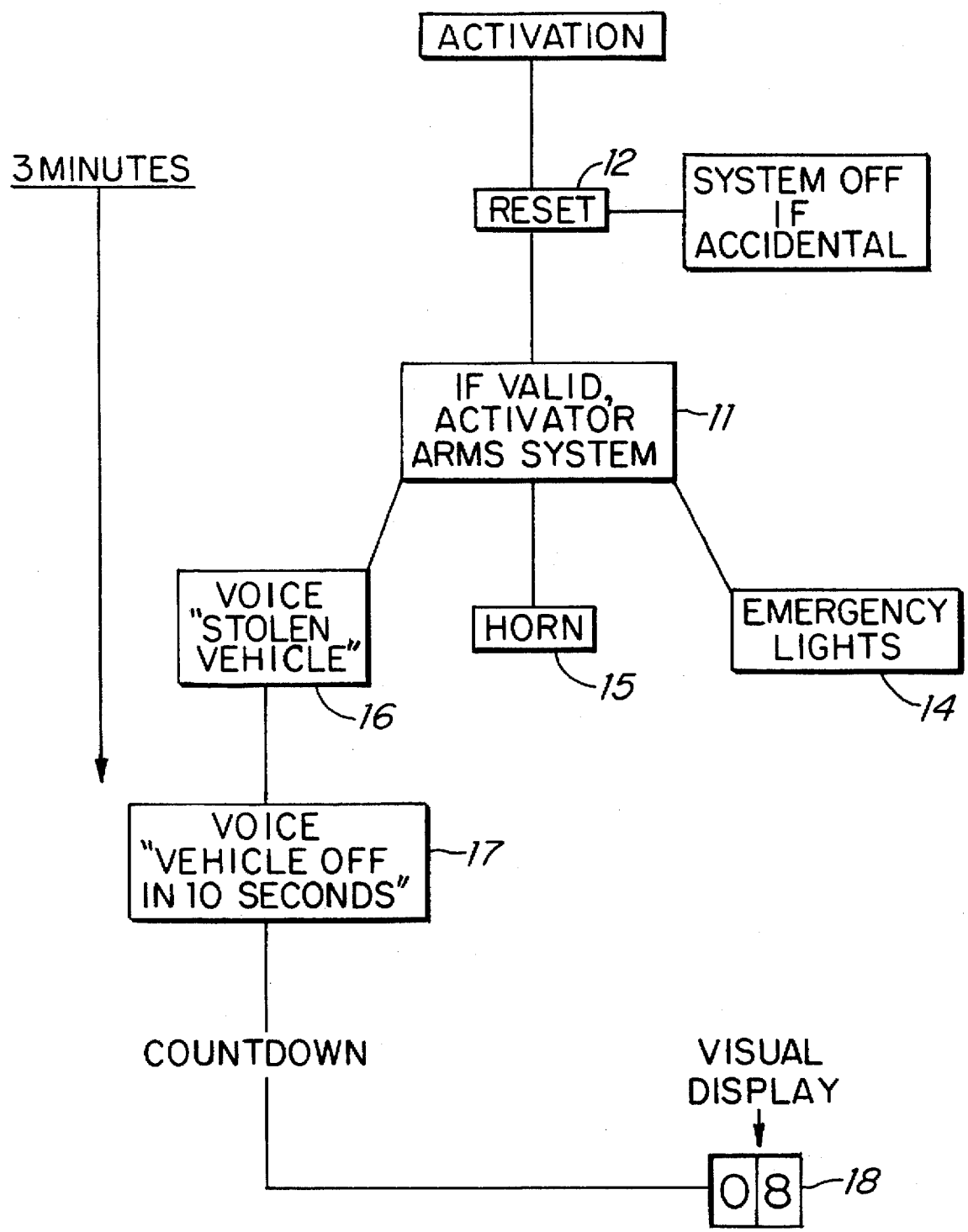
FIG. 1 is a functional flow diagram of a system according to the present invention.

Referring to the drawings, the vehicle anti-theft and recovery system is activated promptly upon a person realizing that his vehicle is being or has been stolen, whereupon vehicle recovery commences by the person telephoning his paging service 10. This call is made from any convenient and available telephone, such as a public phone, business phone, citizen's band phone, etc., whereupon, the pager service calls the pager 21 at the vehicle initiating a beeper signal. Upon receipt of the beeper signal, the pager causes operation of a reset function 12 which checks beeper signal validity, as not being caused by error on-board the vehicle, such as a driver accidentally re-setting the system. If the signal is confirmed as valid, the system is energized or armed, and the beeper signal is amplified and causes activator 11 to energize respective function devices, including a device 16 for presenting a voice warning and of impending vehicle disablement and a device 17 for presenting a voiced countdown in seconds to vehicle disablement. A visual display device 18 which may be synchronous with the voice warning is preferably provided, and which may preferably be light-emitting diodes disposed on a panel on the vehicle.

The functions activated may include, as indicated in FIG. 2, energizing all emergency lights, the later activation of the killswitch to disable the engine, the activation of the vehicle horn and/or a siren, the energizing of a panel display of light-emitting diodes or other lights, etc. on the vehicle exterior to identify the vehicle as stolen.

The respective functions are activated by the application of a digital code to activator 23 which causes actuator circuitry (not shown) in car alarm 22 to actuate specific functions.

The entire sequence can be accomplished within approximately three minutes, so that a vehicle thief stranded in a disabled vehicle is readily identified. The vehicle is stopped after it has been driven only a relatively short distance by engine disablement in typically a conspicuous location while audible and visual indications make the vehicle readily identified as stolen.

As indicated earlier, the audible voice and/or visual display warning provide time for the thief to drive the vehicle out of traffic at the side of the road or street, thus to avoid the vehicle being stopped in a dangerous situation as in a fast lane of traffic, etc., thus to eliminate or reduce the hazards of personal injury, damage to vehicles, etc. This exposure of the vehicle owner or operator to liability for injury to persons, death, or damages to vehicle.

According to FIG. 2, pager 21 may receive a digital formatted signal from a pager service to thus provide display or other signal, in the event the vehicle battery has become disconnected, as in a robbery attempt, whereupon a backup battery switch applies battery power for the vehicle.

An alarm beeper may be utilized on the vehicle for the purpose of notifying the vehicle owner or operator that the vehicle is being tampered with, thus to alert the vehicle owner or person that called the paging service to activate the pager and the anti-theft system in the vehicle. Such an alarm beeper may of course, be activated by unauthorized opening of a door, vehicle hood, etc.

Thus there has been shown and described a novel system and method for vehicle theft prevention and recovery which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

The inventors claim:

1. A vehicle theft prevention and recovery system comprising:

pager means at the vehicle to receive a telephonic signal and to initiate a radio signal with digital modulation for digital data readout formatted to provide predetermined formats, activator means for receiving said formatted digital data from the pager means and transmit respective digital formats to respective actuators to actuate at least means for providing a count-down warning of vehicle disablement to an occupant of the vehicle, and means for disabling the vehicle engine a predetermined time after the means for disabling is activated.

2. A theft prevention and recovery system according to claim 1, wherein:

said means for warning a vehicle occupant provides a voice warning of vehicle disablement within a specific time.

3. A theft prevention and recovery system according to claim 2, wherein:

said warning means provides a vocal audible count-down in seconds to vehicle engine disablement.

4. A vehicle theft prevention and recovery system according to claim 1, wherein:

said means for disabling comprises killswitch means.

5. A vehicle theft prevention and recovery system comprising:

pager means at the vehicle to receive a telephonic signal and initiate a radio signal having digital modulation to provide predetermined digital data readout at the vehicle, activator means connected with the pager means to receive said digital data readout from the pager means and transmit predetermined respective digital formats to respective devices to provide respective functions for vehicle theft prevention and recovery, said activated devices and functions including at least means for warning an occupant in the vehicle of impending vehicle disablement, means for disabling the vehicle engine, and means to warn and alert persons outside the vehicle to avoid injury and damage.

6. A theft prevention and recovery system according to claim 5, wherein:

said means for warning a vehicle occupant comprises means providing a voice warning to the occupant of vehicle disablement within a specific time.

7. A theft prevention and recovery system according to claim 5, wherein:

said warning means comprises means for providing a vocal audible count-down in seconds to vehicle disablement.

8. A vehicle theft prevention and recovery system according to claim 5, wherein:

said means for disabling the vehicle engine comprises killswitch means.

9. A vehicle theft prevention and recovery system according to claim 5, wherein:

said means for warning persons outside the vehicle comprises means for energizing emergency flasher lights on the vehicle.

10. A vehicle theft prevention and recovery system according to claim 5, wherein:

said means to warn and alert persons outside the vehicle comprise a light-emitting diode display on the exterior of the vehicle to identify it as stolen.

11. A vehicle theft prevention and recovery system according to claim 5, wherein:

said means comprises means for activating and energizing a vehicle horn.

12. A vehicle theft prevention and recovery system according to claim 5, wherein:

said means for alerting persons outside the vehicle comprises means for activating a siren.

13. A vehicle theft prevention and recovery system according to claim 5, wherein:

said means for alerting persons outside the vehicle comprises means for activating and energizing a radio beacon to enable police-tracking of the vehicle.

14. A method for vehicle theft prevention and recovery, comprising the steps of:

providing pager means at the vehicle to receive a telephonic signal from a pager service and produce a radio signal having digital modulation for digital readout formatted to provide respective digital format to respective activator means and transmit the digital formats to respective actuators, calling by telephone a pager service to send a telephonic signal to the pager, amplifying the telephonic pager signal to activate respective activator means for respective devices and functions comprising at least means for providing an alarm to a thief occupant of the vehicle warning by a countdown to impending vehicle disablement, means for disabling the vehicle engine, and means to warn and alert persons outside the vehicle to avoid injury and damage.

15. A method according to claim 14, wherein said activated functions include the energizing of emergency lights on the vehicle.

16. A method according to claim 14, wherein said activated functions include audible alarm means on the vehicle.

17. A method according to claim 14, wherein said activated functions include radio beacon means receivable by police.

18. A method according to claim 14, wherein said activated functions include a light-emitting diode display on the exterior of the vehicle to identify it as stolen.

* * * * *